US012570263B2

(12) United States Patent
Al-Mahshi

(10) Patent No.: US 12,570,263 B2
(45) Date of Patent: Mar. 10, 2026

(54) BRAKE SYSTEM WITH TORQUE DISTRIBUTING ASSEMBLY

(71) Applicant: AKEBONO BRAKE INDUSTRY CO., LTD., Tokyo (JP)

(72) Inventor: Waleed Mahmoud Al-Mahshi, Farmington Hills, MI (US)

(73) Assignee: AKEBONO BRAKE INDUSTRY CO., LTD, Tokyo (JP)

( * ) Notice: Subject to any disclaimer, the term of this patent is extended or adjusted under 35 U.S.C. 154(b) by 287 days.

(21) Appl. No.: 18/273,566

(22) PCT Filed: Feb. 28, 2022

(86) PCT No.: PCT/US2022/018130

§ 371 (c)(1),
(2) Date: Jul. 21, 2023

(87) PCT Pub. No.: WO2022/187135

PCT Pub. Date: Sep. 9, 2022

(65) Prior Publication Data

US 2024/0123964 A1 Apr. 18, 2024

Related U.S. Application Data

(60) Provisional application No. 63/154,925, filed on Mar. 1, 2021.

(51) Int. Cl.
B60T 13/74 (2006.01)
F16D 55/226 (2006.01)
(Continued)

(52) U.S. Cl.
CPC .......... B60T 13/746 (2013.01); F16D 55/226 (2013.01); F16D 65/183 (2013.01);
(Continued)

(58) Field of Classification Search
CPC .... B60T 13/746; F16D 55/226; F16D 65/183; F16D 2121/24; F16D 2125/40; F16D 2125/48; F16D 2125/50; F16D 127/06
(Continued)

(56) References Cited

U.S. PATENT DOCUMENTS 9,353,811 B2 5/2016 Gutelius et al.
9,476,469 B2 10/2016 Gutelius
(Continued)

FOREIGN PATENT DOCUMENTS

CN 102762883 A 10/2012
CN 109899413 A 6/2019
(Continued)

OTHER PUBLICATIONS

Japanese Office Action dated Jul. 8, 2024, for Japanese Application 2023-547804.
(Continued)

*Primary Examiner* — Christopher P Schwartz
(74) *Attorney, Agent, or Firm* — The Dobrussin Law Firm, P.C.

(57) ABSTRACT

A brake system (10) comprising: a brake caliper (12) supporting a brake pad (14), and having a first brake piston (24) and a second brake piston (28) that are configured to move the brake pad; a first rotary to linear stage mechanism (32) connected to the first brake piston, and a second rotary to linear stage mechanism (34) connected to the second brake piston; a motor (42) configured to generate torque; a torque distributing assembly (40) configured to receive torque from the motor and then distribute the torque from the motor to the first rotary to linear stage mechanism to move the first brake piston and/or to the second rotary to linear stage mechanism to move the second brake piston; wherein the torque distributing assembly comprises: i) a first driving
(Continued)

gear (44) connected to the first rotary to linear stage mechanism; ii) a second driving gear (46) connected to the second rotary to linear stage mechanism; iii) a first set of planet gears (72) supported on respective first axles (74); iv) a second set of planet gears (98) supported on respective second axles; and v) a first carrier plate (88) having a plurality of support features each configured to support a respective one of the first axles and a respective one of the second axles.

15 Claims, 10 Drawing Sheets

(51) Int. Cl.

| | | |
|---|---|---|
| *F16D 65/18* | (2006.01) | |
| *F16D 121/24* | (2012.01) | |
| *F16D 125/40* | (2012.01) | |
| *F16D 125/48* | (2012.01) | |
| *F16D 125/50* | (2012.01) | |
| *F16D 127/06* | (2012.01) | |

(52) U.S. Cl.
  CPC ...... *F16D 2121/24* (2013.01); *F16D 2125/40* (2013.01); *F16D 2125/48* (2013.01); *F16D 2125/50* (2013.01); *F16D 2127/06* (2013.01)

(58) Field of Classification Search
  USPC ................................ 188/72.1, 72.4, 156–164
  See application file for complete search history.

(56) References Cited

U.S. PATENT DOCUMENTS

| | | | |
|---|---|---|---|
| 9,587,692 | B2 | 3/2017 | Gutelius |
| 9,752,635 | B2 * | 9/2017 | Bahmata ............... F16D 55/226 |
| 10,443,666 | B2 | 10/2019 | Chelaidite et al. |
| 10,518,761 | B2 | 12/2019 | Thomas |
| 11,339,842 | B2 * | 5/2022 | Al-Mahshi ............. F16D 55/22 |
| 2004/0192485 | A1 | 9/2004 | Severinsson |
| 2019/0084543 | A1 | 3/2019 | Bai et al. |
| 2019/0219117 | A1 * | 7/2019 | Choi ..................... F16D 65/183 |
| 2020/0309213 | A1 | 10/2020 | Al-Mahshi |
| 2020/0309214 | A1 | 10/2020 | Al-Mahshi et al. |
| 2021/0016761 | A1 | 1/2021 | Choi |

FOREIGN PATENT DOCUMENTS

| | | |
|---|---|---|
| CN | 211308536 U | 8/2020 |
| CN | 111750009 A | 10/2020 |
| WO | 2017/122739 A1 | 7/2017 |

OTHER PUBLICATIONS

International Search Report and Written Opinion dated Jun. 20, 2022, for International Application PCT/US2022/018130.
English translation of a first Office Action issued by CNIPA on Jan. 7, 2026, in co-pending Chinese Patent Application No. 202280013536. X.

* cited by examiner

BRAKE SYSTEM WITH TORQUE DISTRIBUTING ASSEMBLY

PRIORITY

This application is a National Stage entry of PCT/US2022/018130 filed on Feb. 28, 2022, which claims priority to US 63/154,925 filed on Mar. 1, 2021, all of which are incorporated by reference herein for all purposes.

FIELD

These teachings relate to a brake system, a torque distributing assembly, and to a method of applying a brake using a brake system and/or a torque distributing assembly.

BACKGROUND

Some vehicles utilize multi-piston brake systems to create a clamping force to slow, stop, and/or maintain a vehicle in a stopped or parked position.

To improve braking performance, while also reducing weight, cost, and packaging space, it may be desirable to have an assembly that is configured to move multiple-brake pistons to create and release a clamping force without requiring multiple motors.

For example, while creating and/or releasing the clamping force, it may be desirable to have a brake system and/or assembly that is configured to distribute torque supplied by a motor between two or more brake pistons. The distribution may be based on load or resistance differences acting on the brake pistons, which may occur when the brake pad wears unevenly, due to brake pad taper wear; internal component efficiency and variation in the brake system; and/or system degradation; for example.

SUMMARY

The following commonly owned patent documents are incorporated by reference herein for all purposes: U.S. Pat. No. 9,353,811 dated May 31, 2016; U.S. Pat. No. 9,476,469 dated Oct. 25, 2016; U.S. Pat. No. 9,587,692 dated Mar. 7, 2017; U.S. Pat. No. 10,443,666 dated Oct. 15, 2019; and US 2020/0309213 dated Oct. 1, 2020.

These teachings provide a brake system that includes: a brake caliper supporting a brake pad; a first brake piston and a second brake piston, that are configured to move the brake pad; a first rotary to linear stage mechanism connected to the first brake piston, and a second rotary to linear stage mechanism connected to the second brake piston; a motor configured to generate torque; a torque distributing assembly configured to receive torque from the motor and then distribute the torque from the motor to the first rotary to linear stage mechanism to move the first brake piston and/or to the second rotary to linear stage mechanism to move the second brake piston. The torque distributing assembly may include a first support plate having a plurality of support features configured to support a respective a first driving gear connected to the first rotary to linear stage mechanism; a second driving gear connected to the second rotary to linear stage mechanism; a gear assembly that includes one or more large gears and one or more smaller gears or gears that are generally the same size; a first set of planet gears supported on respective first axles; a second set of planet gears supported on respective second axles; and a first carrier plate having a plurality of support features each configured to support a respective one of the first axles and a respective one of the second axles. The first carrier plate has a first side and an opposing second side, wherein the first set of planet gears are supported on the first side of the first carrier plate and the second set of planet gears are supported on the second side of the first carrier plate. The torque distributing assembly comprises a ring gear having an internal ring portion, wherein the first set of planet gears are situated within the internal ring portion. The ring gear may be a separate piece, or the ring gear may be part of the housing. The torque distributing assembly may include a first support plate having a plurality of support features configured to support a respective one of the first axles. The torque distribution assembly comprises a third set of planet gears supported on respective third axles. The third axles are generally parallel to the first axles and/or the second axles. One or more of the second set of planet gears have a height or length that is larger than a height or length of the one or more third planet gears. The torque distributing assembly comprises a second carrier plate, having a plurality of support features each configured to support a respective one of the third axles. The first carrier plate and the second carrier plate are generally parallel to one another. A central axis extends through the second carrier plate, and a radial distance of the second planet gears from the central axis is greater than a radial distance of the third planet gears from the central axis. Teeth of the third planet gears engage, mesh with, or meshingly engage teeth of a centrally located sun gear. Teeth of the second planet gears engage, mesh with, or meshingly engage the teeth of the third planet gears. In some configurations, the planet gears and/or sun gears may be rearranged or oriented to mesh with other planet gears and/or sun gears that are not explicitly disclosed herein. In other words, while a "first" and "second" and "third" etc. naming convention is used herein, the naming convention is used to differentiate between the different gears. In this regard, the naming or identification of the different gears or gear sets with "first", "second", "third" etc. may be changed or rearranged. Teeth of the second planet gears also meshingly engage teeth of a centrally located secondary sun gear. Each of the two sun gears are attached to individual output gears; one output gear meshingly engages teeth with the first driving gear; the secondary output gear meshingly engages teeth with the second driving gear. The ring gear comprises one or more mounting features for fixing the ring gear to a housing or other non-moving member. The brake pad is an inner brake pad and each of the first and second brake pistons are configured to move an end of the inner brake pad. The brake pad may be an outer brake pad and each of the first and second brake pistons are configured to move an end of the outer brake pad. The brake pad may be an inner brake pad and an outer brake pad and each of the first and second brake pistons are configured to move an end of the inner and/or outer brake pad. The brake pad may be a single pad. The brake pad may comprise two or more discrete pad sections that are individually moved by a corresponding brake piston or rotary to linear stage mechanism. The brake system comprises a brake to prevent movement or back driving of the motor to maintain a clamping force after the motor is turned OFF or is no longer generating torque. The motor and the torque distributing assembly are contained within a housing, and the housing is connected to the brake caliper via one or more fasteners.

DETAILED DESCRIPTION

Figure 1:
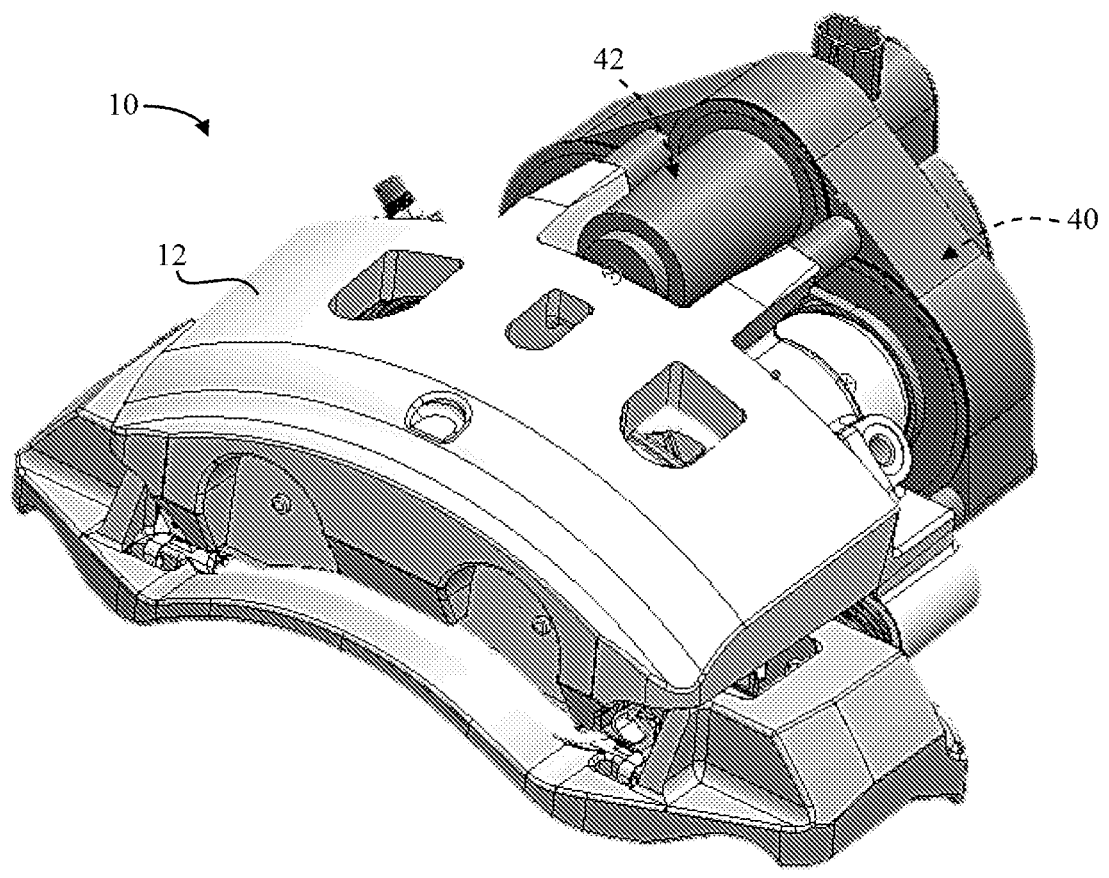
FIG. 1 is a perspective view of a brake system.

These teaching provide a brake system. The brake system may be a system or assembly for creating a clamping force. The brake system may be any system or assembly for releasing a clamping force. The brake system may function to, may be configured to, or may be adapted or enabled to create a clamping force to slow, stop, and/or maintain a vehicle in a stopped position. The clamping force may be used during a service brake operation to slow, stop, and/or maintain a vehicle in a stopped position. The clamping force may be used during a parking brake operation to maintain a vehicle in a stopped or parked position. The clamping force may be used during both a service and parking brake operation. The brake system may have a hydraulic component, where hydraulic fluid is used to move a brake piston and brake pad against a braking surface (i.e., brake rotor) to create a clamping force during a service and/or parking brake operation. The hydraulic component may be applied together with the torque distributing assembly disclosed herein or separately.

The brake system may be an opposed brake system (i.e., a fixed caliper brake system) or a floating brake system (i.e., a floating caliper). The brake system may be a disc brake system. The brake system may be a drum brake system. The brake system may be a service brake system. The brake system may be a parking brake system.

The clamping force may be a force that, when coupled with a brake pad or brake shoe coefficient of friction, functions to decelerate, slow, stop, and/or prevent movement or rotation of a brake rotor, brake drum, and/or a vehicle. The clamping force may be created during a standard brake apply (i.e., a brake apply force). The clamping force may be created during a parking brake apply (i.e., a parking brake force).

The brake system may include one or more brake pads, and a brake caliper supporting two or more brake pistons. During a brake apply, the two or more brake pistons may be moved towards and away from the one or more brake pads by pressurizing brake fluid. Additionally, or alternatively, during a brake apply, the two or more brake pistons and one or more brake pads may be moved with electromechanical elements to create clamping force. The electromechanical elements may include rotary to linear mechanisms, spindle, nut, motor, one or more gears, a torque distributing assembly, or a combination thereof.

The brake rotor may cooperate with the components of the brake system to create the clamping force. The brake rotor may include an inboard side and an opposing outboard side. The brake caliper may be arranged so that one or more brake pads are located at the inboard side of the brake rotor (i.e., inboard brake pads), and one or more brake pads are located at the outboard side of the brake rotor (i.e., outboard brake pads), or both.

The brake caliper may have two or more piston bores. Each piston bore may define a hollow region in the brake caliper configured to receive and support a corresponding brake piston. The piston bores can be located entirely on one side of the brake rotor (i.e., inboard side or outboard side), or on both sides of the brake rotor.

The brake system may have two or more brake pistons. The two or more brake pistons may function to move a brake pad, or a corresponding end of brake pad, towards the brake rotor to create the clamping force. The two or more brake pistons may be located on one side of the brake rotor (i.e., inboard side or outboard side), or one or more brake pistons may be located on each side of the brake rotor.

During a brake apply, to decelerate slow, stop, or maintain a vehicle in a stopped or parked position, the brake pistons may be moved by pressurizing fluid, such as brake fluid. To release the clamping force or the brake apply, the brake piston can be moved by depressurizing the fluid. During a brake apply, to decelerate slow, stop, or maintain a vehicle in a stopped or parked position, the brake pistons may be moved with one or more electromechanical mechanisms (e.g., with one or more rotary to linear mechanisms; spindles; nuts; motors, etc.).

The brake piston pocket may function to receive at least a portion of a corresponding rotary to linear stage mechanism. The brake piston pocket may be a cup or recess formed into an end of a brake piston. The brake piston pocket may include a bottom wall at the end or bottom of the brake piston pocket and an opposing open end. A gap may exist between the nut of the rotary to linear stage mechanism and a corresponding bottom wall. During a brake apply, the gap may be taken up by moving the rotary to linear stage mechanism towards the bottom wall. Once the gap is taken up, further movement of the nut or rotary to linear stage mechanism may cause the nut or the rotary to linear stage mechanism to press against the bottom wall and then move the brake piston and thus brake pad against the brake rotor to create the clamping force.

The one or more brake pads may be used to create the clamping force. The clamping force creates a transfer of energy by converting the kinetic energy of the vehicle into thermal energy by frictionally engaging one or more brake pads with one or more sides of the brake rotor. The one or more brake pads may include one or more features (i.e., ears, projections, etc.) that may engage or be engaged by a brake caliper, a support bracket, or both to maintain the location of the brake pads within the braking system and relative to the brake rotor.

By moving the nut away from the bottom pocket wall, the brake piston may move in an oppose, release direction, so that the brake pad can then move away from the brake rotor to release the clamping force.

The motor may be one or more motors. The motor may be any motor for creating a force or torque. For example, the motor may be a DC motor, a brushless motor, a series-wound motor, a shunt wound motor, a compound wound motor, a separately exited motor, a servomotor, a stepping motor, or a permanent magnet motor. The motor may include one or more electrical leads, terminals, connections, or plugs for connecting the motor to a power source, computer, processor. Supplying power to the motor may cause the output shaft of the motor to rotate about an axis. The output shaft rotation may be adapted for an apply direction (to create a clamping force) and for a release direction (to release a clamping force).

The brake system may comprise one or more rotary to linear mechanisms, which may also be referred to as rotary to linear stage mechanisms. The one or more rotary to linear mechanisms may function to convert a torque output from the motor or torque distributing assembly into a linear or axial force to move the one or more brake pistons. The one or more rotary to linear mechanisms may be a high-efficiency device such as a ball screw, a roller screw, or a ball ramp, for example. The one or more rotary to linear mechanisms may be a low-efficiency device, such as a lead screw, that has higher friction between the spindle and nut compared to a high efficiency device. The one or more rotary to linear mechanisms may generally include a spindle and a nut.

The spindle may be rotated by the motor or corresponding driving gear. The spindle may be rotated in an apply direction and a release direction to apply and release the brake system brake, respectively. Rotation of the spindle may cause a nut that is threadably engaged with the spindle to move axially along an axis in an apply or release direction to move the brake pad towards or away from a brake rotor. The spindle may be driven directly by a driving gear (direct connection or attachment between the two elements). The spindle may be driven indirectly by a driving gear (indirect connection or attachment between the two elements, meaning one or more gears, shafts, belts, chains, or other intermediate connection members are provided between the spindle and the driving gear).

The nut may be moved axially along an axis that the spindle is configured to rotate about. For example, the nut and the spindle may be threadably engaged such that when the spindle is rotated by the motor or driving gear, the nut moves axially toward or away from a wall of the piston pocket. After contact between the nut and the piston pocket wall is made, further movement of the nut may result in movement of a brake piston and thus a brake pad, or a corresponding end of a brake pad towards a brake pad. The nut may be restricted or prevented from rotating about the axis along which it is configured to axially move.

The torque distributing assembly may function to distribute an output torque from one or more motors or gear train to or amongst two or more brake pistons or rotary to linear mechanisms during a brake apply, a parking brake apply, or both to create a clamping force. The torque distributing assembly may function to distribute an output torque from one or more motors or gear train to or amongst two or more brake pistons or rotary to linear mechanism during a brake release, a parking brake release, or both to release a clamping force. The torque distributing assembly may function to distribute, increase, decrease, or multiply an output torque from one or more motors or gear train to or amongst two or more brake pistons or rotary to linear mechanisms during a brake apply, a parking brake apply, or both to create a clamping force. Thus, the torque distributing assembly may also be referred to as a torque multiplying and distributing assembly; a torque increasing and distributing assembly, a torque decreasing and distributing assembly, etc.

While creating and/or releasing the clamping force, the torque distributing assembly according to these teachings is configured to distribute or re-distribute torque between two or more brake pistons based on load or resistance differences acting on the two or more brake pistons.

The torque distributing assembly may be configured to distribute torque from the motor generally equally to both of the first brake piston and the second brake piston so that both of the brake pistons are moved unison until a resistance on one of the two brake pistons becomes higher than the other brake piston. The torque distributing assembly may then be configured to distribute power from the motor to the brake piston with the lower resistance so that the piston assembly with the higher resistance slows or ceases to move.

For example, when one end of a brake pad contacts a brake rotor, the brake piston associated with that end of the brake pad may experience an increase in load or resistance or reaction force acting on it. Accordingly, the torque distributing assembly according to these teachings is configured to reduce a torque supply to that brake piston and then distribute the torque supply from the motor to the other brake piston so that the other corresponding end of the brake pad is moved towards and into contact with the brake rotor. Accordingly, with these teachings, a single motor can be used to move multiple brake pistons to create a clamping force.

For example, uneven or different loads or forces acting on the brake pistons may be a result of the friction material of the brake pad wearing unevenly, which means one end of the brake pad may contact the brake rotor and build clamping force before the other end contacts the brake rotor. The brake pistons associated with the end of the brake pad that contacts and builds clamping force first will apply a greater reactive load or resistance on that brake piston.

For example, uneven or different loads or forces acting on the brake pistons may be a result of system degradation where one brake piston moves faster than another brake piston, which means one end of the brake pad may contact the brake rotor and build clamping force before the other end contacts the brake rotor. The brake pistons associated with the end of the brake pad that contacts and builds clamping force first will apply a greater reactive load or resistance on that brake piston.

For example, uneven or different loads or forces acting on the brake pistons may be a result of tolerance differences in the rotary to linear mechanisms, tolerance variations in the brake piston and caliper bores in which the brake piston is located. These variations may result in one brake piston moving faster or farther than another brake piston, which means one end of the brake pad may contact the brake rotor and build clamping force before the other end contacts the brake rotor. The brake pistons associated with the end of the brake pad that contacts and builds clamping force first will apply a greater reactive load or resistance on that brake piston.

For example, uneven or different loads or forces acting on the brake pistons may be a result of uneven or warped brake rotor surfaces.

The torque distributing assembly may include one or more drive gears. The one or more drive gears may function to transfer torque from the motor or torque distributing assembly to the corresponding spindle. The drive gear may frictionally engage a corresponding spindle. The drive gear may engage a corresponding spindle via spines and corresponding notches defined on the spindle and drive gear.

Any gear disclosed herein may be replaced by two or more gears. Any two or more gears disclosed herein may be replaced by a single gear. One or more intermediate gears may be provided between any two or more gears disclosed herein as directly meshingly engaging one another. Any intermediate disclosed herein between two or more other gears may be eliminated.

Any gear disclosed herein may be a spur gear, helical gear, bevel gear, worm gear. In other words, for example, while reference is made to a spur gear in this disclosure, the spur gear may be replaced with any gear, such as a helical gear.

While the gears disclosed herein are described as having teeth that mesh with or meshingly engage other teeth gears to transmit torque between the gears, it is understood that other means can be used to transmit torque such as, for example, using one or more belts, chains, intermediate gears, shafts, rack and pinions, axles, etc. Moreover, in certain applications, the teeth on one or more of the gears may be eliminated and the gears may engage one another via a pressure or friction fit to transmit torque. Furthermore, any gear disclosed herein may be replaced with a shaft, belt, chain, or other torque transmitting means. Furthermore, any of the gears and their orientation disclosed herein may be rearranged and still be within the scope of this disclosure.

The gears disclosed herein may be made of any material, such as metal, plastic, 3D printed, etc.

Any of the gears, elements, or assemblies disclosed herein may be rearranged such that a previously disclosed element extending along or rotating about the main axis A may extend along or rotate about another axis that is parallel to the main axis A or is not parallel or coaxial (such as perpendicular or at another angle) relative to the main axis A. The main axis may be referred to as a central axis or center axis.

One or more bearings and/or bushings may be provided at any interface where one or more gears are described as rotating about a shaft or axis.

The brake system and/or clamping force disclosed herein may be utilized for any vehicle (i.e., passenger or cargo car, truck, utility, or off-road vehicle). The brake system and/or clamping force disclosed herein may be utilized for service brake applications (i.e., to slow, stop, or prevent movement of a road wheel or vehicle). The brake system and/or clamping force disclosed herein may be utilized for parking brake applications (i.e., to prevent movement of a road wheel or vehicle). The brake system and/or clamping force disclosed herein may be utilized for parking brake applications while a hydraulic or other brake system is utilized for service brake operations.

Various embodiments are disclosed herein. It is within the scope of this disclosure that the elements of the embodiments may be combined, duplicated, or separated into additional embodiments. Also, any element disclosed herein may be eliminated from any of the assemblies disclosed herein, duplicated, and/or combined with other elements.

A brake system 10 is illustrated at FIG. 1. The brake system 10 comprises a brake caliper 12. A torque distributing assembly 40 and motor 42 are used to move one or more of the brake pistons supported in the brake caliper 12 to create and release a clamping force, as will be described further below. It should be noted again that any singular element disclosed herein can be duplicated or multiplied in any amount. For example, reference to "a motor" does not necessarily mean only a single motor is contemplated. Instead, "a motor" may mean one or more two or more motors, three or more motors, etc., without departing from the scope of this disclosure. The same holds true for any other disclosure herein, including but not limited to: brake piston, rotary to linear stage mechanism, spindle, nut, caliper, torque distributing assembly, gear, etc. In the same vein, any reference to duplicate or multiple parts may be separated or isolated into only a single part.

Figure 2:
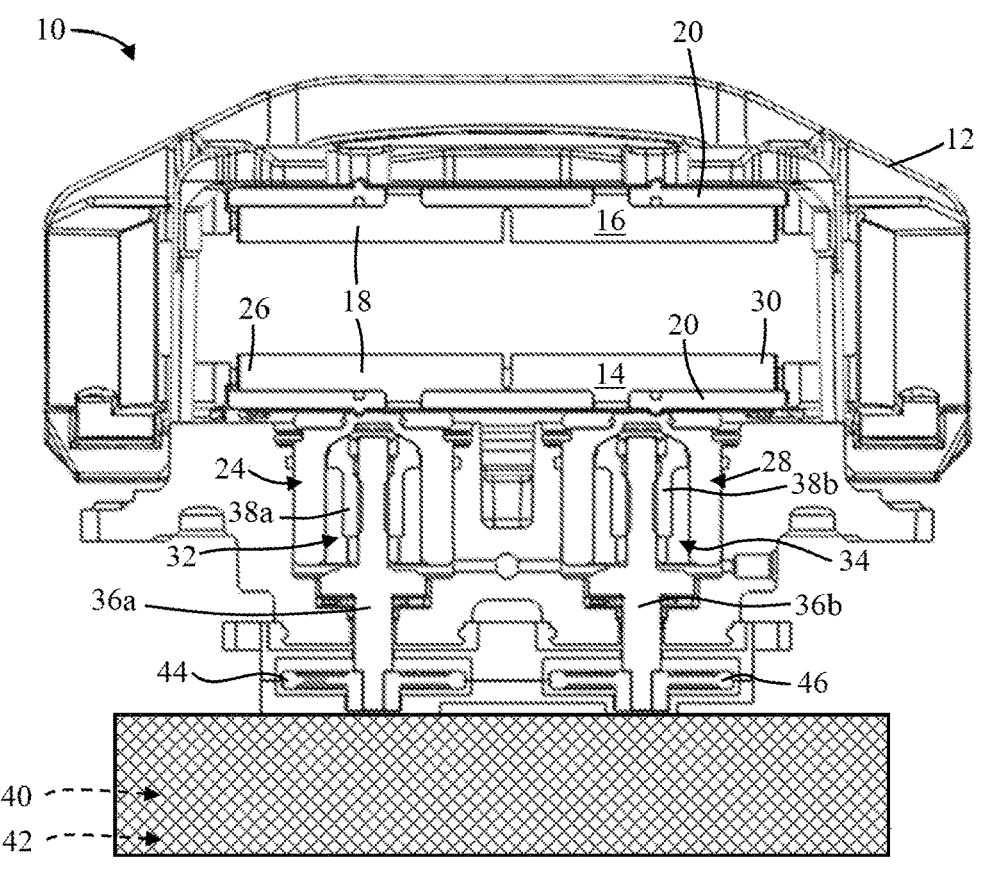
FIG. 2 is a cross-sectional view of a brake system.

FIG. 2 illustrates the brake system 10. The brake caliper 12 is configured to support an inboard brake pad 14 and an outboard brake pad 16. Each brake pad 14, 16 comprises a friction material 18 and a pressure plate 20. The brake pads 14, 16 are arranged on opposing sides of the brake caliper 12 such that the friction material 20 of each brake pad 14, 16 faces a side of a brake rotor that can be between the brake pads 14, 16.

A first brake piston 24 is located at or near a first or leading end 26 of the inboard brake pad 14. A second brake piston 28 is located at or near a second or trailing end 30 of the inboard brake pad 14. While this disclosure focuses on two brake pistons 24, 28 arranged at the inboard side of the brake caliper 12, it is understood that the brake system 10 may include any number of brake pistons arranged on the inboard and/or outboard side of the brake caliper 12, including, but not limited to one or more brake pistons, two or more brake pistons, three or more brake pistons, four or more brake pistons, eight or more brake pistons, etc.

Moreover, while the torque distributing assembly 40 is described as configured for moving the first and second brake pistons 24, 28 at the inboard side of the brake caliper 12, it is understood that the torque distributing assembly 40 can move any number of the brake pistons that are located at the inboard and/or outboard side of the brake caliper 12. In other words, the torque distributing assembly 40 can be configured to move brake pistons on only one side of the brake caliper 12 or on both sides of the brake caliper 12.

Furthermore, it is contemplated that a brake system 10 may have one or more than one torque distributing assemblies 40 on the inboard side of the caliper 12, on the outboard side of the caliper 12, or on both inboard and outboard sides of the brake caliper 12.

The brake system 10 comprises a first rotary to linear stage mechanism 32 and a second rotary to linear stage mechanism 34. In certain parts of this description, one or both of these elements may also be referred to as a rotary to linear mechanism. Each rotary to linear stage mechanism 32, 34 comprises a spindle 36a, b and a nut 38a, b. In some configurations, the nut 38a, 38b may be incorporated into or may be the brake piston 24, 28. That is, the brake piston 24, 28 may be directly engaged by the corresponding spindle 36a, 36b, without the need for an additional intermediate nut 38a, 38b. Of course, in such a configuration, the brake piston 24, 28 may thus be referred to as a nut 38a, 38b. Each rotary to linear stage mechanism 32, 34 is configured for converting a rotatory force or torque acting on the spindle into a linear pressing force via the threaded engagement of the spindle and nut. That is, the spindle is caused to be rotated about a spindle axis, which causes the nut to move axially along a length of the spindle or spindle axis. The nut engages the brake caliper 12 sufficiently to prevent the nut from rotating about the axis during its axial/linear movement. Movement or actuation of the rotary to linear stage mechanism 32, 34 causes the corresponding brake pistons 24, 28 to move towards or away from the inboard brake pad 14, which causes the corresponding end(s) 26, 30 of the brake pad 14 to move towards or away from the brake rotor to create or release the clamping force.

The torque distributing assembly 40 is operatively connected to the brake system 10. A motor 42 is operatively connected to the torque distributing assembly 40 and/or to the brake system 10.

The torque distributing assembly 40 comprises a first driving gear 44 and a second driving gear 46. The first driving gear 44 may be in direct or indirect communication with the first spindle 36a, described further below with reference to FIG. 3. The second driving gear 46 may be in direct or indirect communication with the second spindle 36b, also described further below with reference to FIG. 3. Rotation of the first driving gear 44 causes the first spindle 36a to rotate about its longitudinal spindle axis, which causes the first nut 38a to move axially along the first spindle's longitudinal axis. Rotation of the second driving gear 46 causes the second spindle 36b to rotate about its longitudinal spindle axis, which causes the second nut 38b to move axially along the second spindle's longitudinal axis.

Figure 3:
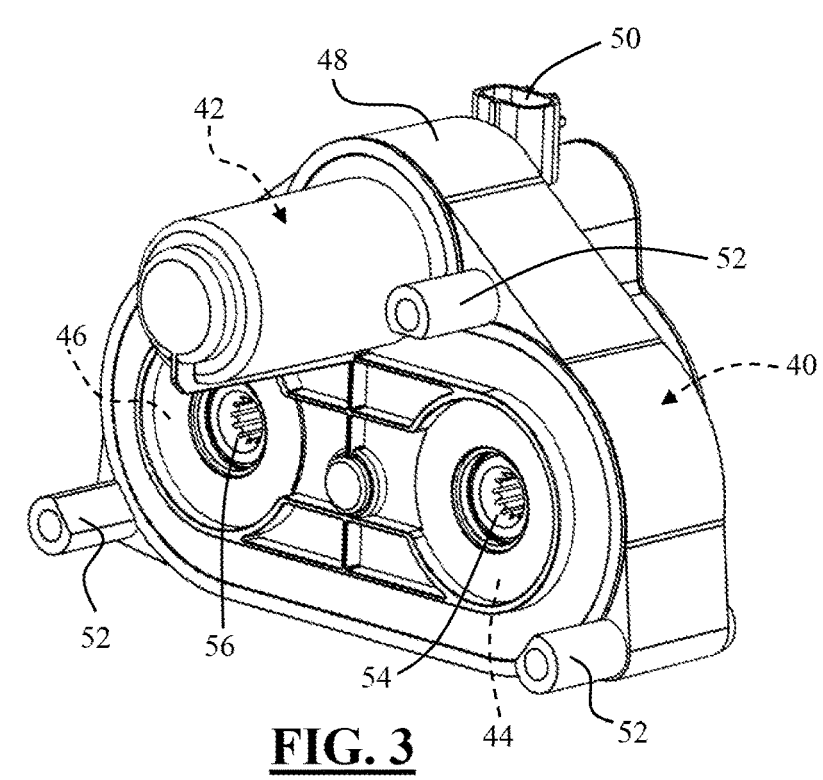
FIG. 3 is a perspective view of a motor gear unit housing, which includes a torque distributing assembly.

Referring now to FIG. 3, the torque distributing assembly 40 and motor 42 may be contained or supported in a housing 48 (which may be referred to as a motor gear unit housing). One or more plugs, wire harnesses, or receptacles 50 may be provided for connecting the brake system 10, torque distributing assembly 40, and/or motor 42 to a source of power, a computer or controller, and/or to the vehicle.

The housing 48 may be connected or attached to the brake caliper 12 via one or more fasteners 52 (i.e., bolts, screws, welds, etc.). The connection may be permanent (meaning the housing 48 and/or the elements located within the housing 48 and brake caliper 12 cannot be separated without destroying either or both of the housing 48 and caliper 12. Alternatively, the housing 48 may be separable from the brake caliper 12 (via the fasteners 50). Separable may mean that the housing 48 and/or the elements located within the housing 48 can be separated from the brake caliper 12 without destroying the functionality of one or both of the housing 48 and/or the elements located within the housing 48 and the caliper 12. Separability may advantageously provide for serviceability of the brake system 10, brake caliper 12, and/or the torque distributing assembly 40. Separability may also provide for different housings 48 containing different torque distributing assemblies 40 and/or motors 42 to be installed on a single, common brake caliper 12. For example, this may advantageously provide a brake system supplier or vehicle assembler the flexibility or ability to provide or customize different torque distributing assemblies 40 and/or motors 42 depending on specific applications and/or needs for attaching or connecting to a standard or common brake system 10 or brake caliper 12.

Figure 4:
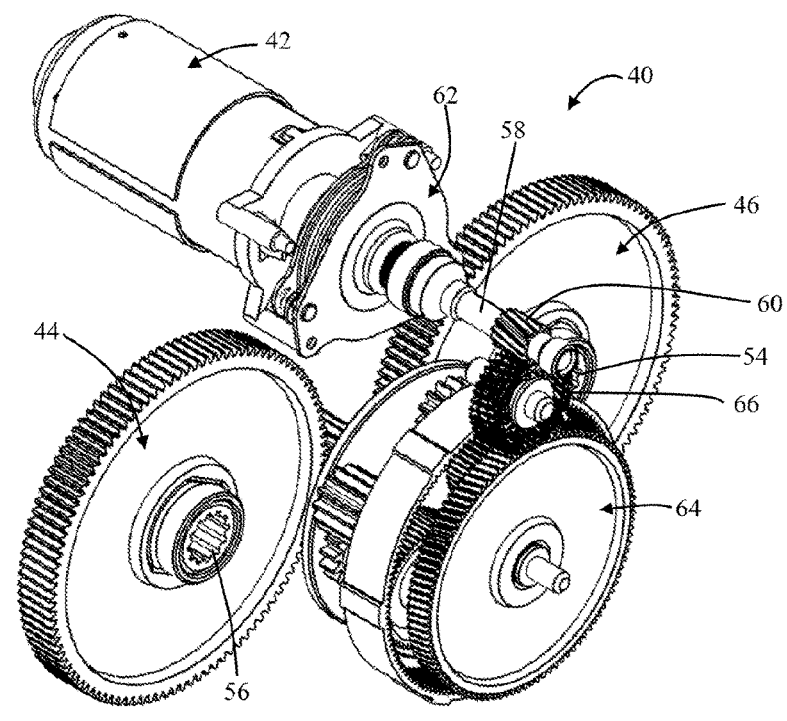
FIG. 4 is a perspective view of the torque distributing assembly, without the housing.
Figure 5:
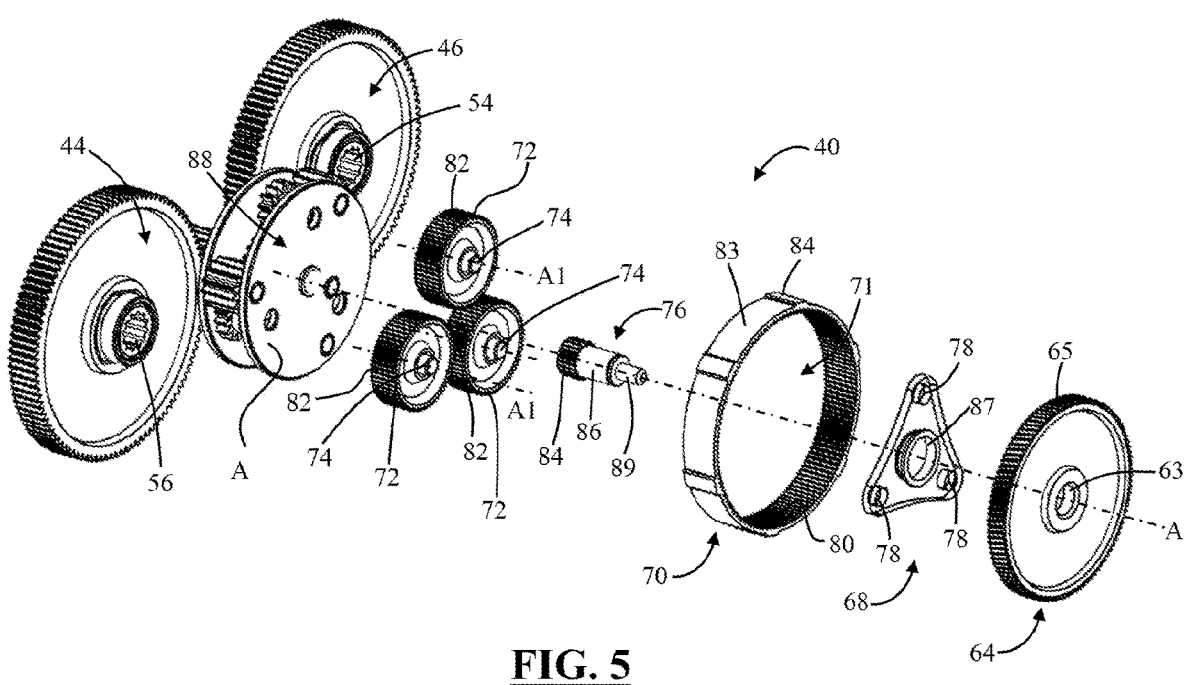
FIG. 5 is a perspective and partially exploded view of some of the elements of the torque distributing assembly.

As illustrated in FIGS. 3, 4, and 5, each of the first and second driving gears 44, 46 have an output feature 54, 56. The output features 54, 56 may be directly connected to a mating input feature on each spindle 36a, 36b such that rotation of the respective driving gear 44, 46 causes torque to transfer directly from the driving gear to the respective spindle 36a, 36b. The outer output features 54, 56 are illustrated as female splines that engage a male splined mating feature on the spindles 36a, 36b. It is understood that these features can be reversed and one or both of the output features 54, 56 may be male features that engage mating female features on the spindles 36a, 36b. Alternatively, one or more intermediate torque transferring elements, like one or more intermediate gears, shafts, belts, chains, or the like, may be provided between the respective driving gear 44, 46 and/or output features 54, 56 and the corresponding spindle 36a, 36b, though which torque can be transferred.

FIG. 4 illustrates the entire mechanism, without the housing. The torque distributing assembly is illustrated at 40 and the motor at 42. The motor 42 may be part of the torque distributing assembly 40 or the motor 42 may be a separate element of the torque distributing assembly 40. The motor 42 is an electric motor that is configured to generate torque in response to a supply of one or more electrical signals and/or power. The generated torque is output from the motor 40 via a motor output gear 60 located on the motor output shaft 58. A brake 62 may be connected to the motor 40, the output shaft 58, and/or the output gear 60. The brake or clutch 62 may function to lock the motor 40 and prevent movement or back driving of the output shaft 58 and/or the output gear 60 to maintain the clamping force after the motor 42 is turned OFF or is no longer generating torque. The brake 62 may be described in commonly owned U.S. Pat. No. 10,518,761 B2 dated Dec. 31, 2019, the entire contents of which is hereby incorporated by reference herein for all purposes.

The torque distributing assembly 40 comprises a first or input gear 64. The first gear 64 may be an input gear. The first gear 64 receives torque from the motor 42, the motor output gear 60, and/or the motor output shaft 58. Alternatively, one or more intermediate or transfer members 66 may be provided between the motor output gear 60 and the first gear 64. The one or more intermediate or transfer members 66 may be one or more gears, shafts, chains, cables, or belts. The one or more intermediate transfer members 66 may function to increase or decrease a speed and/or torque output from the motor 42 and/or change a rotational direction of the torque output. The first gear 64 includes teeth 65 that mesh with or meshingly engage the teeth of the transfer gear 66.

Referring to FIG. 5, the torque distributing assembly 40 comprises the first gear 64, a first support plate 68, a ring gear 70, one or more first planet gears 72 (three are illustrated) each of which are supported on a respective first shaft 74. The first planet gears 72 may be referred to as a first set of planet gears 72, and the first shafts 74 may also be referred to as first axles 74. Thus, the first set of planet gears 72 may be supported on respective first axles 74. The first planet gears 72 are arranged or disposed around a first sun gear 76.

The first support plate 68 comprises one or more first support features 78 that are each configured to support an end of one of the one or more first shafts 74. Since there are three first shafts 74, the first support plate 68 comprises three support features 78. The support features 78 may be apertures into which the first shafts 74 are press-fit or secured such that the shafts 74 are free from moving or rotating. The first support plate 68 comprises a center aperture or hub 87 that is configured to engage a hub or bushing 86 on the first sun gear 76 described further below. The first support plate 68 is configured to rotate about the main axis A.

The ring gear 70 is a circular member that has an internal gear portion 71 that is sized to accommodate the one or more first planet gears 72 therewithin. The internal gear portion 71 comprises teeth 80 that are configured to mesh with or meshingly engage the teeth 82 of the one or more first planet gears 72. The ring gear 70 may be fixed or press fit or attached or integrated to the housing 48 such that the ring gear 70 does not move or rotate about the main axis A. For example, an outside surface 83 of the ring gear 70 may include one or more ridges ribs or mounting features 84 to fix or attach the ring gear 70 to the housing 48 or to another non-moving member. In some embodiments, the ring gear 70 may be part of the housing (i.e., an integrated component) or fixed component. However, in certain embodiments, the ring gear 70 may be configured to move or rotate about or relative to the main axis A. In certain embodiments, the outside surface 83 of the ring gear 70 may include teeth that mesh with or meshingly engage teeth of other gears.

The one or more first planet gears 72 may fit inside or within the internal gear portion 71 of the first ring gear 70. In addition to meshing with or engaging the teeth 80 on the inside of the first ring gear 70, the teeth 82 of the one or more first planet gears 72 also mesh with or engage teeth 84 on the first sun gear 76. The one or more first planet gears 72 are configured to spin about each of the respective first shaft axes A1. The first axes A1 may be parallel to the main axis A. The first axes A1 may be non-parallel to the main axis A. The one or more first planet gears 72 are also configured to rotate about the main axis A.

The first sun gear 76 may be centrally located relative to the one or more first planet gears 72. The first sun gear 76 comprises a hub or bushing 86 onto which an aperture 87 of the first support plate 68 and an aperture 63 of the first gear 64 is mounted. The first gear 64 can be press-fit, attached, or secured to the hub or bushing 86 such that rotation of the first gear 64 about the main axis A causes the first sun gear 76 to also rotate about the main axis A. The first sun gear 76 includes an end 89 that is fixed to or supported by the housing 48 to support the first sun gear 76 and the other elements of the torque distributing assembly 40 and brake system 12.

When the first gear 64 is rotated about the hub 86 and the main axis A (due to torque supplied from the motor 42), the one or more first planet gears 72 rotate about the main axis A, and the first support plate 68 thus also rotates with the one or more first planet gears 72 about the hub 86 and the main axis A.

Figure 6:
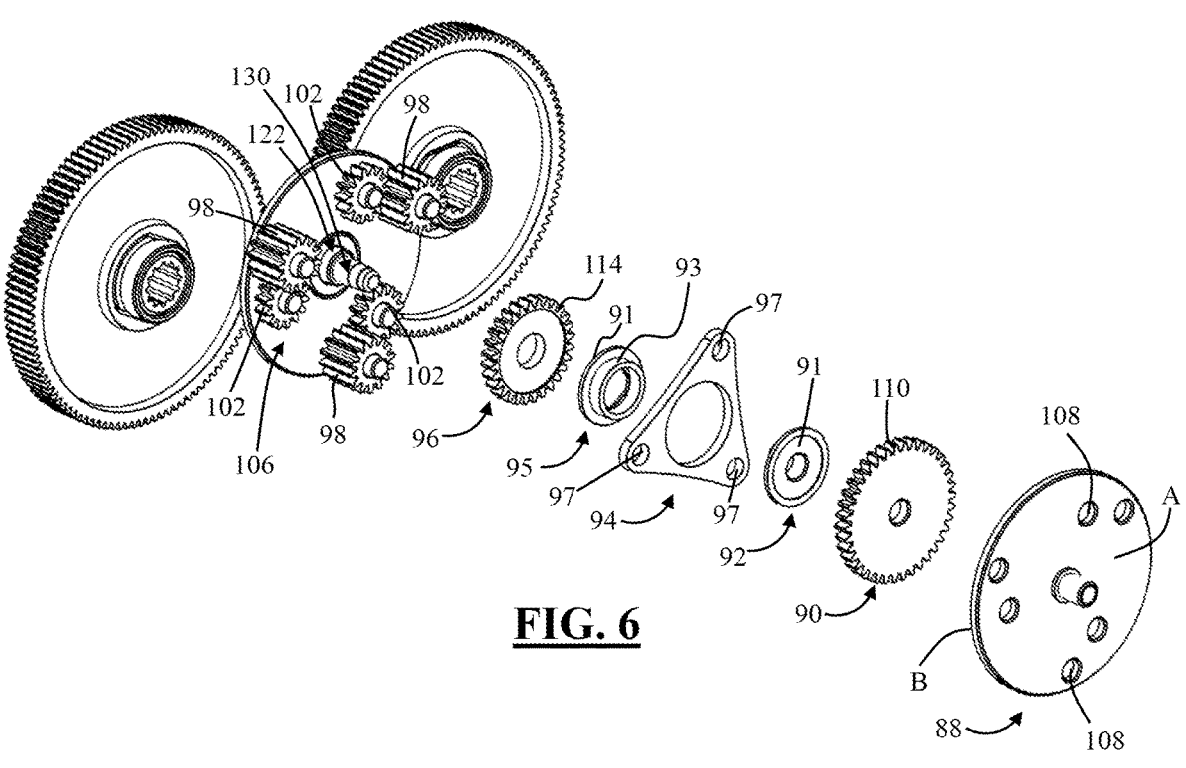
FIG. 6 is a perspective and partially exploded view of some of the elements of the torque distributing assembly.
Figure 7:
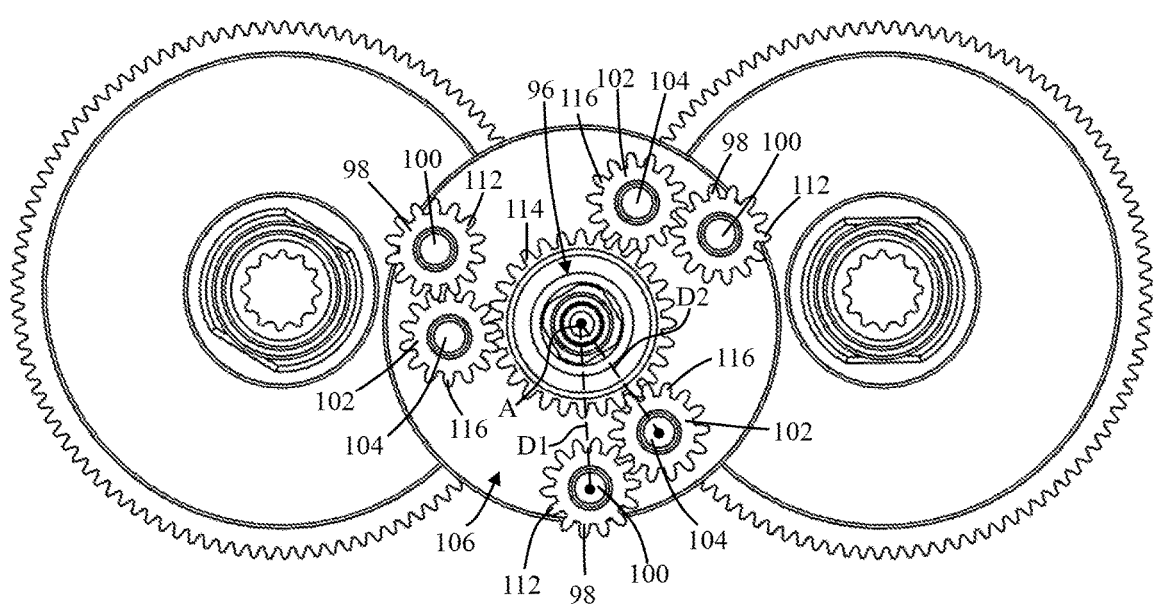
FIG. 7 is a front view of some of the elements of the torque distributing assembly.

The torque distributing assembly 40 comprises a first carrier plate 88 and other elements, which are described in more detail in FIG. 6 and FIG. 7. The first carrier plate 88 has a first side A and an opposing second side B. The sides may be parallel to one another. The first set of planet gears 72 are supported on the first side A of the first carrier plate 88 and the second set of planet gears 98 are supported on the second side B of the first carrier plate 88. The first and second driving gears 44, 46 and the corresponding output features 54, 56 are also shown in FIG. 5. The output features 54, 56 may be splines, however, any other output feature, pattern, or geometry may be used for engaging the respective spindles. The splined features may be advantageous in providing for the housing or torque distributing assembly 40 to be separable from the brake system 10 or caliper 12, as was previously described above.

Referring to FIG. 6, the torque distributing assembly 40 further comprises the first carrier plate 88, a second sun gear 90, a first friction adding member 92, a second support plate 94, a load generating member 93, a second friction adding member 95, and a third sun gear 96. And with additional reference to FIG. 7, the torque distributing assembly 40 comprises one or more second planet gears 98 each supported on respective second shafts 100, one or more third planet gears 102 each supported on respective third shafts 104, and a second carrier plate 106. The second planet gears 98 may be referred to as a second set of planet gears 98, and the second shafts 100 may be referred to as second axles 100. Thus, the second set of planet gears 98 may be supported on respective second axles 100. The third planet gears 102 may be referred to as a third set of planet gears 102, and the third shafts 104 may be referred to as third axles 104. Thus, the third set of planet gears 102 may be supported on respective third axles 104.

The first carrier plate 88 comprises a plurality of second support features 108 that are each configured to support an end of one of the one or more second shafts or axles 100 supporting the one or more second planet gears 98 and an end of one of the one or more first shafts or axles 74 supporting the one or more first planet gears 72 (See FIG. 5). The shafts 100, 74 may be press-fit or secured to the first carrier plate 88 and/or support features 108 such that the shafts 100, 74 are restricted, prevented, or free from individually moving or rotating.

The second sun gear 90 is centrally located relative to the one or more second planet gears 98 and has teeth 110 that mesh with or meshingly engage the teeth 112 of the second planet gears 98.

The first and second friction adding members 92, 95 may engage one another and/or the load generating member 93 and sandwich second support plate 94 therebetween. The first and second friction adding members 92, 95 may be located on opposite sides of the load generating member 93. The first and second friction adding members 92, 95 may be supported by the second support plate 94 and provide a standoff or spacer for the elements of the torque distributing assembly 40. One or both of the friction adding members 92, 95 may be moveable relative to one another and/or the support plate 94. One or both of the friction adding members 92, 95 may include a friction surface 91 that faces a respective one of the sun gears 90, 96 and functions to abut, contact, or press against the respective second and/or third sun gear 90, 96 to apply a load or friction against one or both of the sun gears 92, 95. In some configurations, the friction surface 91 may be incorporated into or attached to the load generating member 93. The load generating member 93 may be an O-ring or spring, such as a conical spring, helical spring, wave spring, belleville washer, etc. that functions to spread or separate or move the two friction adding members 92, 95 away from one another and/or or away from the support plate 94 so that the respective friction surfaces 91 are moved or biased into contact with or against the sun gears 90, 96 to apply the load onto the respective sun gears 90, 96. The friction adding members 92, 95 and/or the friction surfaces 91 may be made of rubber, plastic, or other material that when pressed or moved against the second and/or third sun gear 90, 96 will function to increase a load or resistance on the second and/or third sun gear 90, 96 and/or torque distributing assembly 40. The friction adding members 92, 95 may be a one-way ball bearing, a one-way actuator, a one-way clutch, a slip clutch, a friction clutch. The friction adding members 92, 95 and/or friction surfaces 91 may add a sufficient amount of friction or resistance to the torque distributing assembly 40 so that the friction in one or both of the rotary to linear stage mechanisms 32, 34 (i.e., the friction between the threads of spindle and nut for example) is less than the friction or resistance in the torque distributing assembly 40. That is, by frictionally engaging the second and/or third sun gears 90, 96 so that friction in the torque distributing assembly 40 is greater than the friction in the rotary to linear stage mechanisms 32, 34, the torque distributing assembly 40 will function like a closed or locked differential when releasing the clamping force so that both of the rotary to linear stage mechanisms 32, 34 can be rotated together in a release direction to release the clamping force.

The second support plate 94 comprises one or more third support features 97 that are each configured to support an end of one of the one or more third shafts 104 that support the third planet gears 102. Since there are three third shafts 104, the second support plate 94 comprises three support features 97. The support features 97 may be apertures into which the third shafts 104 are press-fit or secured such that the shafts 104 are free from moving or rotating.

The third sun gear 96 is centrally located relative to the third planet gears 102 and has teeth 114 that mesh with or meshingly engage the teeth 116 of the third planet gears 102.

A radial height or length of the one or more second planet gears 98 is larger than a radial height or length of the one or more third planet gears 102. In other words, the one or more second planet gears 98 extend farther away from the second carrier plate 106 than the one or more third planet gears 102. This enables the teeth 112 of the second planet gears 98 to mesh with or meshingly engage the teeth 110 of the second sun gear 90, while extending past (and not contacting) the third sun gear 96 and the second support plate 94.

As shown in FIG. 7, the teeth 112 of the second planet gears 98 mesh with or meshingly engage the teeth 116 of the third plane gears 102. Also, a radial distance D1 of the second planet gears 98 from the main axis or central axis or center axis A or the center of the second plate 94 is greater than a radial distance D2 of the third planet gears 102 from the main axis A or the center of the second plate 94.

The second carrier plate 106 comprises support features (like the support features 108 in the first carrier plate 88) that are configured to support an opposing end of one of the one or more second and third shafts 100, 104.

The torque distributing assembly 40 comprises a support shaft or axle 130 that is fixed or supported by the second carrier plate 106. The shaft 130 is configured to support the transfer shaft 122 (which is fixed to the third sun gear 96), the friction adding members 92, 95, second support plate 94, fixed to the second sun gear 90 and may be supported by the first carrier plate 88.

Figure 8:
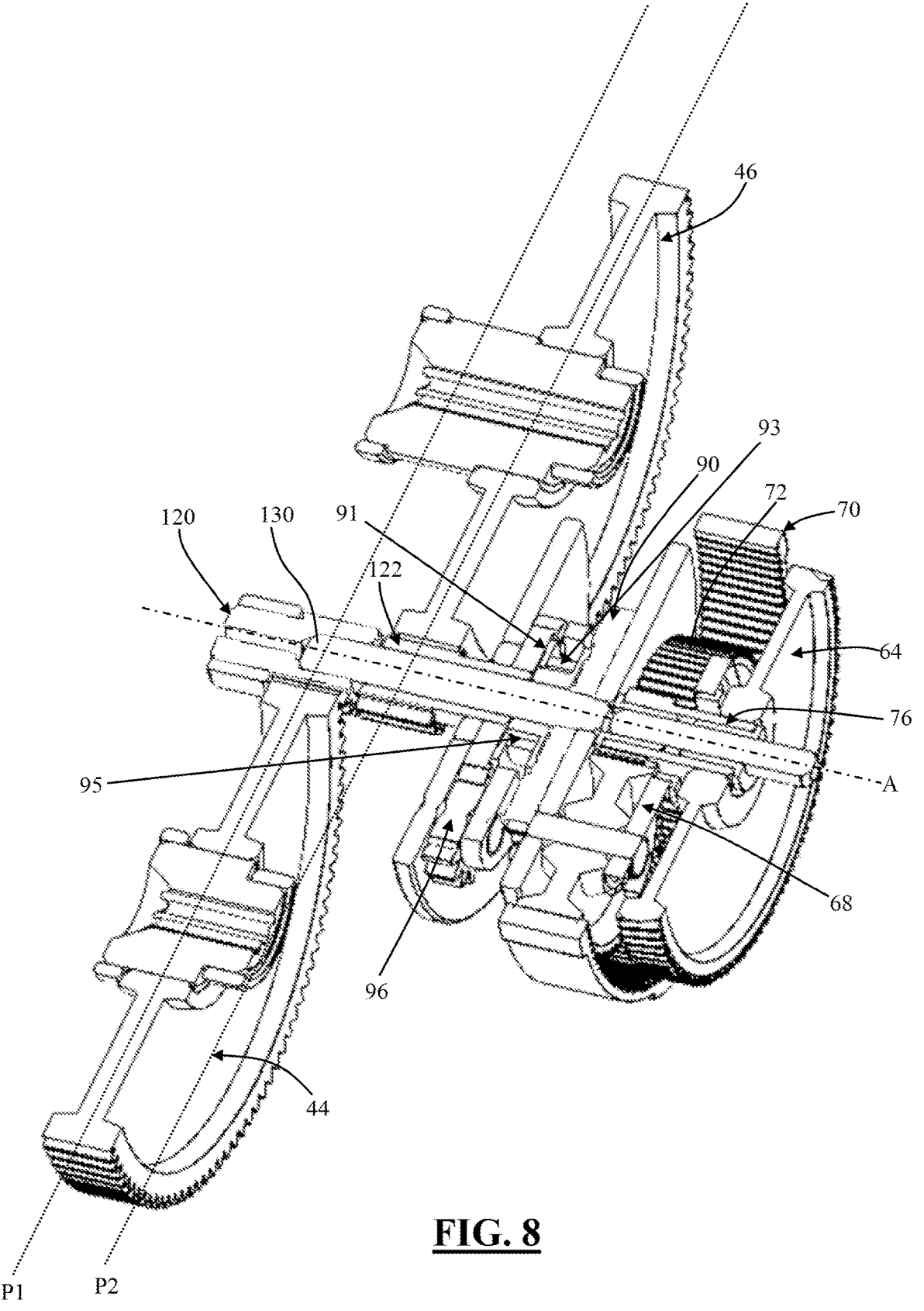
FIG. 8 is a perspective, sectional view of the torque distributing assembly.

Referring to FIG. 8, and to the previous FIGS. 1-7, a method of creating a clamping force will be described. The method may be used to move one or both of the brake pads against the brake rotor to create friction to create the clamping force to slow, stop, or maintain a road wheel or vehicle in a stopped or parked position. The clamping force may be created during a service brake application and/or during a parking brake application.

Figure 9:
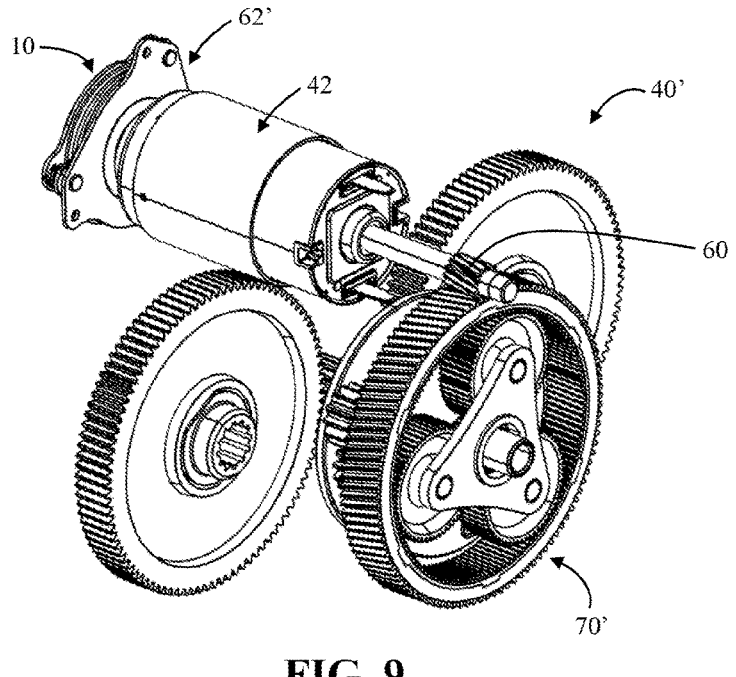
FIG. 9 is a perspective view of a torque distributing assembly, without the housing.

The method includes a step of turning ON the motor 42, as shown in FIG. 9 for example. This may occur by depressing the vehicle brake pedal, by pushing one or more buttons, by putting the transmission into a park gear, and/or by turning the vehicle ignition OFF. Turning the motor 42 ON means that one or more electronic signals and/or electric power is supplied or communicated to the motor 42. Turning the motor 42 ON causes the motor 42 to generate or increase a torque output. The torque 42 is output from the motor 42 through the motor output shaft 58 and/or the motor output gear 60. The generated torque is output to the first gear 64 directly from the motor output shaft 58 as shown in FIG. 4 for example, or the motor output gear 60, or through one or more intermediate transfer members 66, which causes the first gear 64 to rotate about the main axis A.

In FIG. 5 for example, by way of the engagement between the first gear 64 and the first sun gear 76 (engagement of elements 86 and 63, for example), rotation of the first gear 64 about the main axis A results in the first sun gear 76 also rotating about the main axis A. Rotation of the first sun gear 76 about the main axis A causes the one or more first planet gears 72 to rotate about the main axis within the internal gear portion 71 of the first ring gear 70. The one or more first planet gears 72 also spin about each of their respective shaft

74 axes A1. Due to the engagement of the first support plate 68 with the first shafts 74, the first support plate 68 also rotates about the main axis A.

By way of the engagement between the first shafts 74 and the first carrier plate 88 (engagement of elements 74 and 108, for example), the rotation of the first planet gears 72 about the main axis A causes the first carrier plate 88 to rotate about the main axis A.

By way of the engagement between the second shafts 100 and the first carrier plate 88 and the second carrier plate 106 (engagement of elements 100 and 108, for example), the rotation of the first carrier plate 88 about the main axis A causes the second carrier plate 106 to rotate about the main axis A.

During the rotation of the second carrier plate 106 about the main axis, the second planet gears 98 rotate about the main axis A, which causes the second sun gear 90 to rotate about the main axis. With specific reference to FIG. 8, the second sun gear 90 engages a transfer shaft 130 that includes a gear 120 with teeth that meshes with or meshingly engages the first driving gear 44. Accordingly, rotation of the second sun gear 90 causes the transfer shaft 130 and gear 120 to rotate, which thus causes the first driving gear 44 to rotate. As was described above, the first driving gear 44 directly or indirectly transfers torque to the first spindle 36a, causing it to rotate about its axis. Rotation of the first spindle 36a about its axis causes the first nut 38a to move axially towards a bottom of the first brake piston 24. After the first nut 38a contacts the bottom of the first brake piston 24, continued axial movement of the first nut 38a causes the first brake piston 24 to move into contact with the brake pad 14 and move the brake pad 14 into contact with the brake rotor to generate the clamping force required to slow, stop, or maintain the brake rotor and the road wheel in a stopped or parked position.

During the rotation of the second carrier plate 106 about the main axis, the third planet gears 102 also rotate about the main axis A, which causes the third sun gear 96 to rotate about the main axis. With specific reference to FIG. 8, the third sun gear 96 engages a transfer shaft 122 that has a gear with teeth on it that meshes with or meshingly engages the second driving gear 46. The transfer shaft 122 may include an internal bore or passage through which the transfer shaft 130 can pass and freely rotate therein. Accordingly, the transfer shafts 130, 122 may be arranged to extend along and rotate about a common axis, the main axis A. Of course, it is possible the transfer shafts 130, 122 rotate about axes that are not coaxial or parallel.

Rotation of the third sun gear 96 causes the transfer shaft 122 and gear to rotate, which thus causes the second driving gear 46 to rotate. As was described above, the second driving gear 46 directly or indirectly transfers torque to the second spindle 36b, causing it to rotate about its axis. Rotation of the second spindle 36b about its axis causes the second nut 38b to move axially towards a bottom of the second brake piston 28. After the second nut 38b contacts the bottom of the second brake piston 28, continued axial movement of the second nut 38b causes the second brake piston 28 to move into contact with the brake pad 14 and move the brake pad 14 into contact with the brake rotor to generate the clamping force required to slow, stop, or maintain the brake rotor and the road wheel in a stopped or parked position.

The aforementioned movement and rotation of the driving gears 44, 46 and corresponding rotary to linear stage mechanisms may occur at substantially the same time or sequentially (one after the other).

When one of the ends 26, 30 of the brake pad 14 contacts the brake rotor, a load or resistance or reaction force acting on the corresponding brake piston 24, 28, nut 38*a*, 38*b*, spindle 36, 36*b*, and driving gear 44, 46 may increase. When this occurs, the torque transferring assembly 40 may function to increase or direct a torque supply from the motor to the driving gear 44, 46 with the lower load or resistance or reaction force acting on it, while decreasing, ceasing, or eliminating any further torque supply to the driving gear 44, 46 with the higher load or resistance or reaction force acting on it.

For example, assuming the first driving gear 44 has a higher load or resistance on it compared to the second driving gear 46, which may occur if the end 26 of the brake pad 14 is in contact with the brake rotor and the other end 30 is not, or if the end 26 of the brake pad 14 is frictionally engaging the brake rotor with a greater force than the other end 30. This may occur as a result of brake pad taper wear. When this occurs, a greater load or resistance will be applied onto the gear 120 by the first driving gear 44, which will then apply a higher load or resistance onto the transfer shaft 130. The transfer shaft 130 will apply the higher load or resistance to the second sun gear 90, which will function to slow or stop the rotation of the second sun gear 90 about the main axis A, which will cause the second planet gears 98 to increase their spinning speed about each of their respective second shafts 100. The increase in spinning speed of the second planet gears 98 about each of their respective second shafts 100 will cause the third planet gears 102 to correspondingly increase their spinning speed about each of the respective third shafts 104. The increased spinning of the third planet gears 102 will be correspondingly transferred to the third sun gear 96 via the meshing engagement of the teeth 114, 116, causing the third sun gear 96 to increase its rotational spinning speed about the main axis A. The increased speed of the third sun gear 96 rotating about the main axis A will then be transferred to the gear 122, causing the gear 122 to increase its rotational speed. The increase in rotational speed of the gear 122 will thus be correspondingly transferred to the second driving gear 46, which will then be transferred to the second brake piston 28 via the second rotary to linear stage mechanism 34, as was described above.

In another operating example, this time assuming that the second driving gear 46 has a higher load or resistance on it compared to the first driving gear 44, a higher load or resistance will be applied onto the gear 122 by the second driving gear 46, which will then apply a higher load or resistance onto the third sun gear 96, which will cause the third sun gear 96 to slow or stop its rotation about the main axis A, which will cause the third planet gears 102 to increase their spinning speed about each of their respective second shafts 104. The increase in spinning speed of the third planet gears 102 about each of their respective second shafts 104 will cause the second planet gears 98 to correspondingly increase their spinning speed about each of their respective second shafts 100 via the meshing engagement of teeth 112, 116. The increased spinning of the second planet gears 98 will be correspondingly transferred to the second sun gear 90 via the meshing engagement of the teeth 110, 112, causing the second sun gear 90 to correspondingly increase its rotational speed about the main axis A. The increased speed of the second sun gear 90 rotating about the main axis A will be transferred to the transfer shaft 130, causing the gear 120 to increase its rotational speed. The increase in rotational speed of the gear 120 will thus be transferred to the first driving gear 44, which will then be transferred to the first brake piston 24 via the first rotary to linear stage mechanism 32, as was described above.

The first driving gear 44 is located in a first plane P1 and the second driving gear 46 is located in a second plane P2. The two planes P1, P2 are parallel to one another, meaning one of the planes P1 is closer to the brake rotor in vehicle position than the other plane P2. Of course, this arrangement can be flipped and the plane P2 can be arranged closer to the brake rotor than the other plane P1. In some configurations, the planes P1 and P2 may be the same or coplanar.

Figure 10:
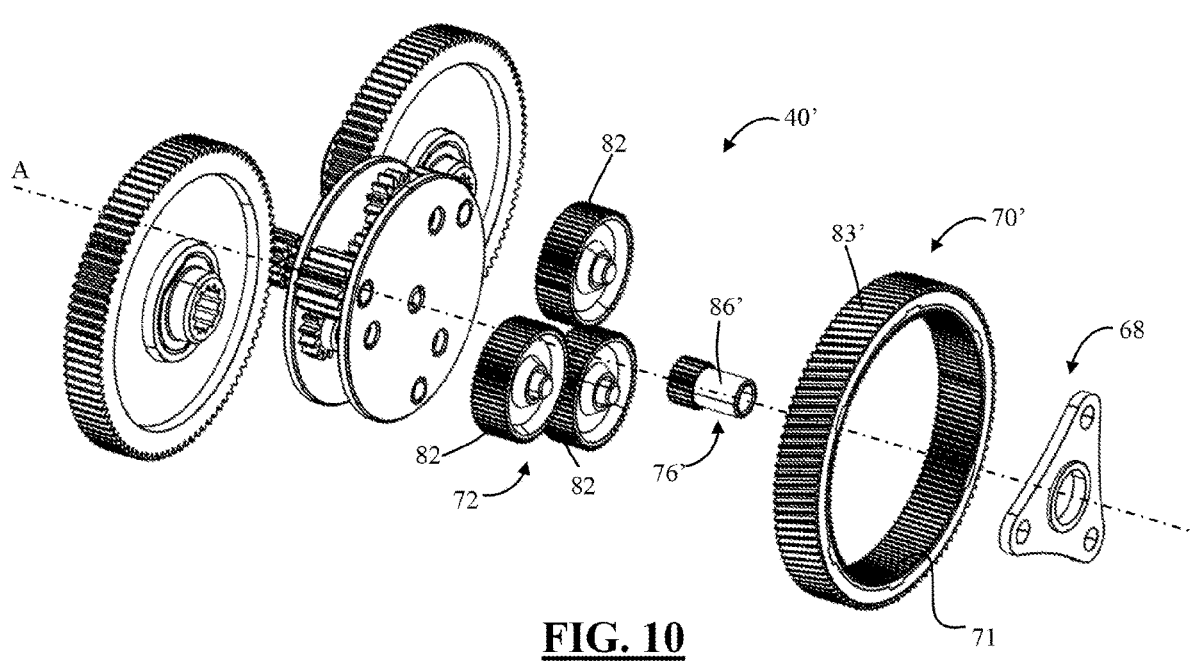
FIG. 10 is a perspective and partially exploded view of FIG. 9, excluding the motor assembly.

FIG. 9 and FIG. 10 illustrate another torque distributing assembly 40'. The torque distributing assembly 40' assembly includes a number of similar elements as the torque distributing assembly 40; thus, a description and function of several of the common elements are not recited again.

The brake 62' may be and may function the same as brake 62, but in FIGS. 9 and 10 is illustrated as attached to a back region of the motor 42. This may be advantageous in accommodating packaging space within the housing 48 or at the vehicle. This may be advantageous to prevent brake 62' from being exposed to grease or oils that may or may not be detrimental to brake 62' function. In some embodiments, the brake 62 or brake 62' may be provided outside of the housing 48 instead of inside the housing 48, like in the assembly 40 described above.

The torque distributing assembly 40' includes a ring gear 70' that has teeth 83' on the outside surface thereof. The teeth of the motor gear 60 may mesh with or meshingly engage the teeth 83' of the ring gear 70' and cause the ring gear 70' to rotate about the main axis A. Rotation of the ring gear 70' about the axis A will cause the one or more first planet gears 72' to rotate about the main axis via the engagement of teeth 71 and teeth 82 on the one or more first planet gears 72'. The first sun gear 76' may be fixed from rotation about the main axis A, for example by connecting it to a non-moving or rotating element, like the housing 48 (FIG. 3). Accordingly, the support plate 68 needs to be enabled to rotate about the hub 86' of the first sun gear 76'.

The remainder of the elements and operation of the torque distributing assembly 40' may be substantially the same as was described above with reference to the torque distributing assembly 40.

Figure 11:
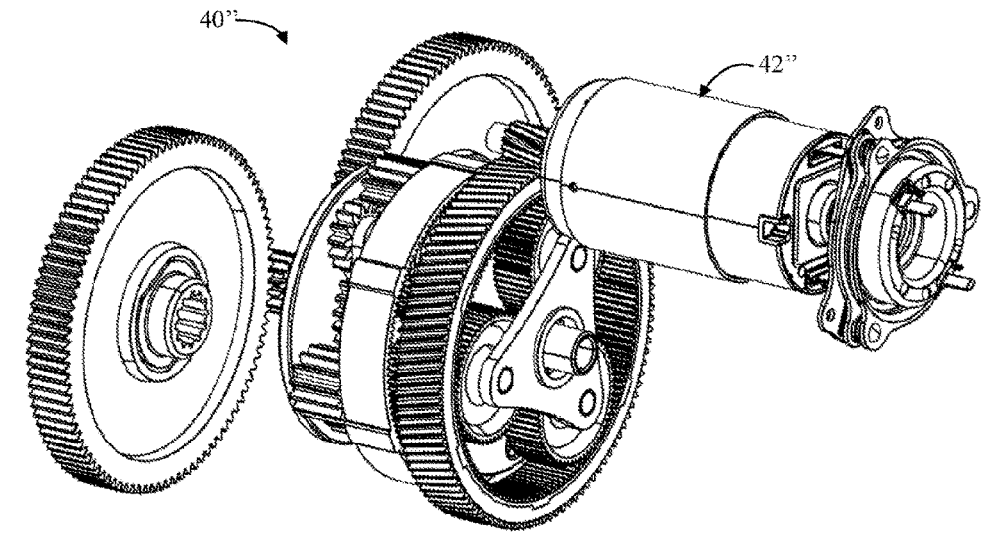
FIG. 11 is a perspective view of a torque distributing assembly.
Figure 12:
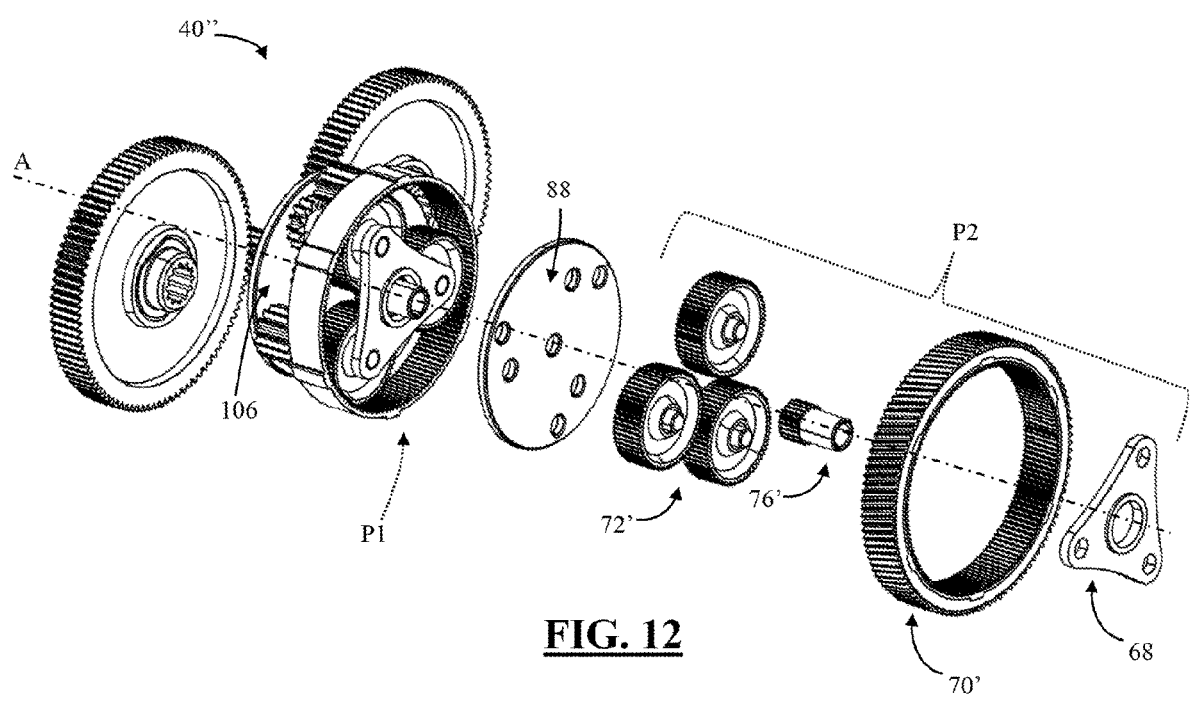
FIG. 12 is a perspective and partially exploded view of FIG. 11, excluding the motor assembly.
Figure 13:
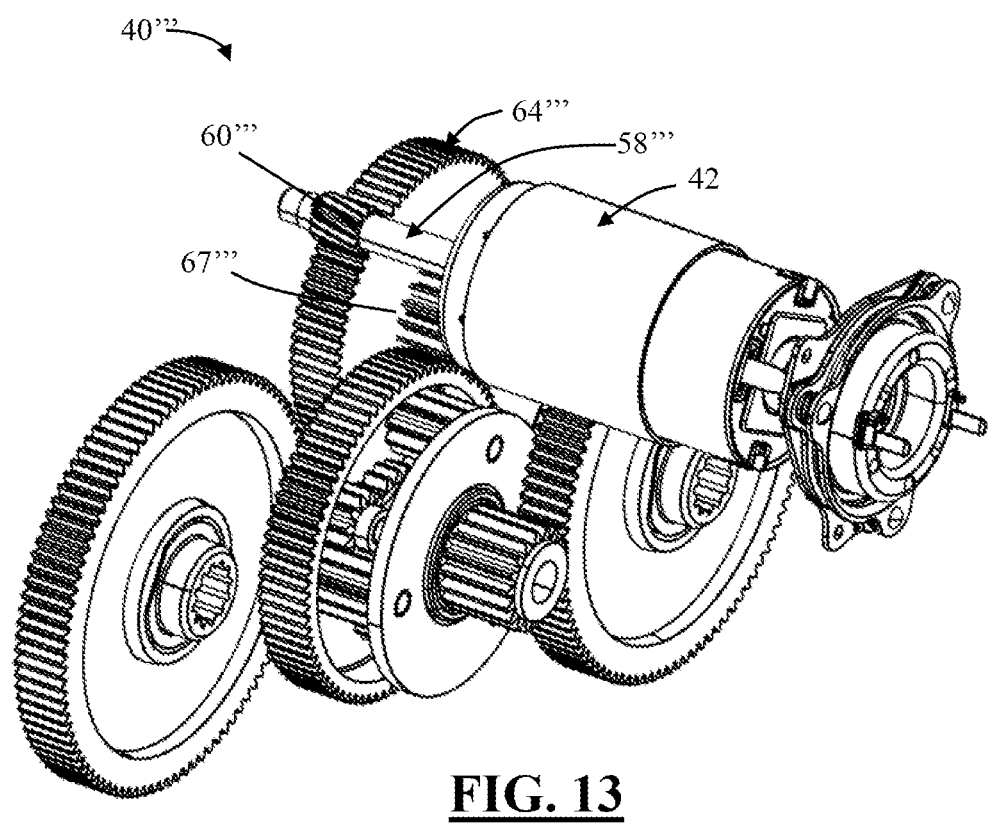
FIG. 13 is a perspective view of a torque distributing assembly, without the housing.
Figure 14:
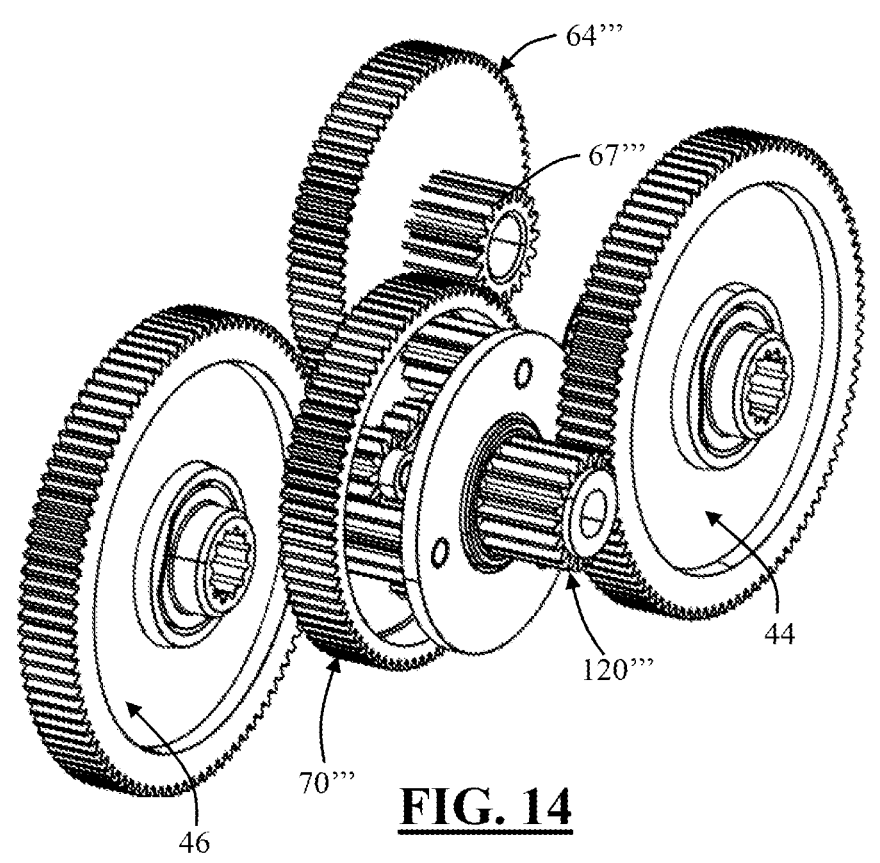
FIG. 14 is a perspective view of the torque distributing assembly of FIG. 13 with the motor removed for clarity.
Figure 15:
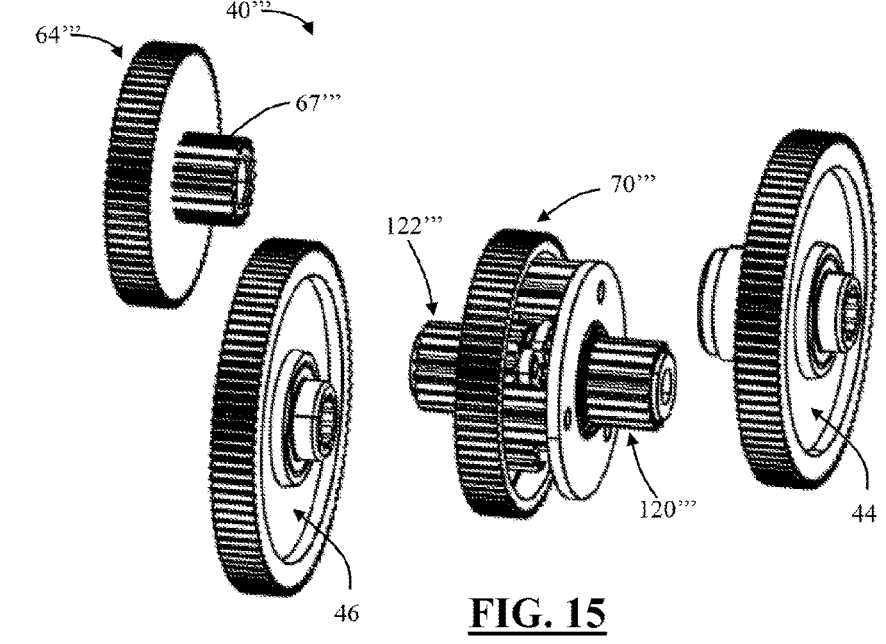
FIG. 15 is a perspective and partially exploded view of FIG. 14.
Figure 16:
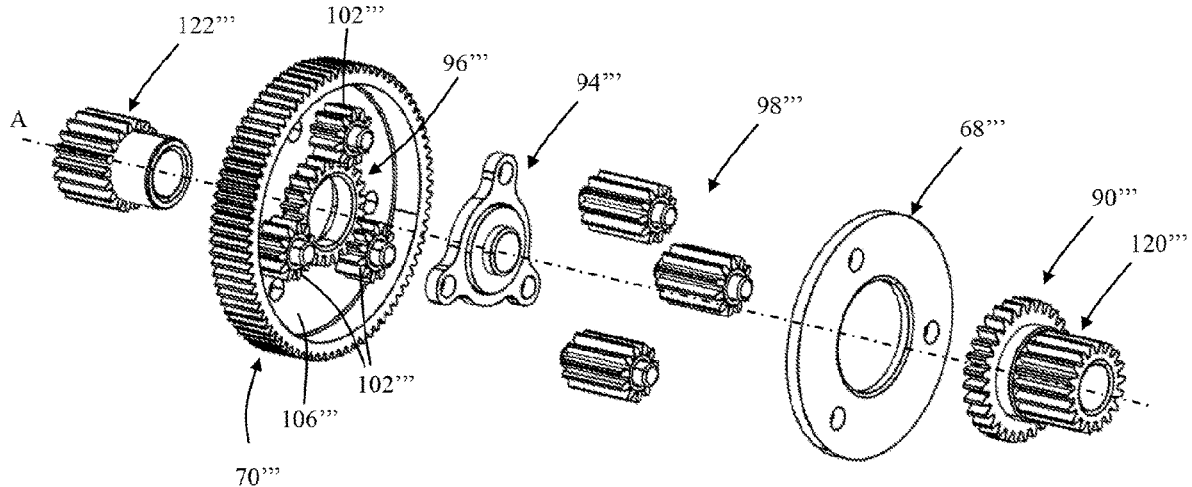
FIG. 16 is a perspective and partially exploded view of FIG. 15.

FIGS. 11 and 12 illustrate another torque distributing assembly 40". The torque distributing assembly 40" assembly includes a number of similar elements as the torque distributing assembly 40 and 40'; thus, a description and function of several of the common elements are not recited again.

The motor 42" is rearranged and provided on an opposite side of the torque distributing assembly 40".

The torque distributing assembly 40" comprises two planetary stages, P1 and P2.

The first planetary stage P1 includes elements sandwiched between the first and second carrier plates 88, 106. The elements comprise those illustrated and described above in FIGS. 4-8. That is, the first planetary stage P1 comprises: the first support plate 68, the ring gear 70, the first sun gear 76, the first planet gears 72', the first shafts 74, the second sun gear 90, the first friction adding member 92, the support plate 94, the second friction adding member 95, the friction surface 91, load generating member 93, the third sun gear 96, axle 130, gear 120, gear 122, second planet gears 98 and the second shafts 100, the third planet gears 102 and the third shafts 104. The elements of the first planet stage P1 will not be again described in the interest of brevity.

The second planetary stage P2 comprises elements from the torque distributing assembly 40' illustrated and described above at FIGS. 9 and 10. That is, the second planetary stage P2 comprises: the support plate 68', the ring gear 70', the sun gear 76', and the one or more planet gears 72'. The support plate 68', sun gear 76', and one or more planet gears 72' may or may not be the same as support plate 68, sun gear 76, and one or more planet gears 72. The elements of the second planet stage P2 will not be again described in the interest of brevity.

FIGS. 13, 14, 15 and 16 illustrate another torque distributing assembly 40'''. The torque distributing assembly 40''' assembly includes a number of similar elements as the torque distributing assembly 40, 40', 40''; thus, a description and function of several of the common elements are not recited again.

The torque distributing assembly 40''' includes an input gear 64''' that is driven by the motor 42 via shaft 58''' and gear 60'''. The input gear 64''' comprises an output portion or gear 67''' fixed to it such that rotation of the input gear 64''' causes the output portion 67''' to rotate with it. The output portion 67''' comprises teeth that mesh with or meshingly engage the teeth of the ring gear 70''', which causes the ring gear 70''' to rotate. The ring gear 70''' may be combined with or attached to the carrier plate 106''' such that rotation of the ring gear 70''' also causes the carrier plate 106''' to rotate. Rotation of the carrier plate 106''' about axis A causes the planet gears 102''' (may be referred to as third planet gears in other embodiments) to rotate about the axis A while they also spin about each of the individual axle shafts that are connected to the carrier plate 106'''. Rotation of the planet gears 102''' about axis A causes the sun gear 96''' (may be referred to as third sun gear in other embodiments) to rotate about axis A, which causes the output portion or gear 122''' to rotate with the sun gear 96'''. The output portion or gear 122''' meshes with or meshingly engages the teeth on the second driving gear 46, which drives or causes the secondary rotary to linear stage mechanism 34 to move.

Rotation of the carrier plate 106''' about axis A also causes the planet gears 98''' (may be referred to as second planet gears in other embodiments) to rotate about the axis A while they also spin about each of the individual axle shafts, which are connected to the carrier plate 106''' and the support plate 68'''. Rotation of the planet gears 98''' about axis A causes the sun gear 90''' (may be referred to as second sun gear in other embodiments) to rotate about axis A, which causes the output portion or gear 120''' to rotate with the sun gear 90'''. The output portion or gear 120''' meshes with or meshingly engages the teeth on the first driving gear 44, which drives or causes the first rotary to linear stage mechanism 32 to move.

When a higher load or resistance is acting on one of the driving gears 44, 46, the torque distributing assembly 40''' functions to supply more torque to the driving gear 44, 46 with the lower load or resistance acting on it and supply less or no torque to the driving gear 44, 46 with the higher load or resistance acting on it.

For example, when a higher load or resistance acts on driving gear 46 compared to driving gear 44, the higher load or resistance acting on gear 46 will cause the gear 122''' to slow or cease rotating, which will cause sun gear 96''' to slow or stop, which will cause the planet gears 102''' to increase their spinning speed about their individual shaft axes. Because the teeth of the planet gears 102''' mesh with the teeth of the planet gears 98''', the planet gears 98''' will also correspondingly increase their spinning speed about their individual shafts. The increase in spinning speed of the planet gears 120''' about their individual shaft axes will cause the sun gear 90''' to increase its rotational speed about the axis A, which will cause the output portion or gear 120''' to increase its speed, thus causing the driving gear 44 to continue rotating and at a greater speed than before.

For example, when a higher load or resistance acts on driving gear 44 compared to driving gear 46, the higher load or resistance acting on driving gear 44 will cause the output 120''' and the sun gear 90''' to slow or cease rotating, which will cause the planet gears 98''' to increase their spinning speed about their individual shaft axes. Because the teeth of the planet gears 98''' mesh with the teeth of the planet gets 102''', the planet gears 102''' will also correspondingly increase their spinning speed about their individual shafts. The increase in spinning speed of the planet gears 102''' about their individual shaft axes will cause the sun gear 96''' to increase its rotational speed about the axis A, which will cause the output portion or gear 122''' to increase its speed, thus causing the driving gear 46 to continue rotating and at a greater speed than before.

Figure 17:
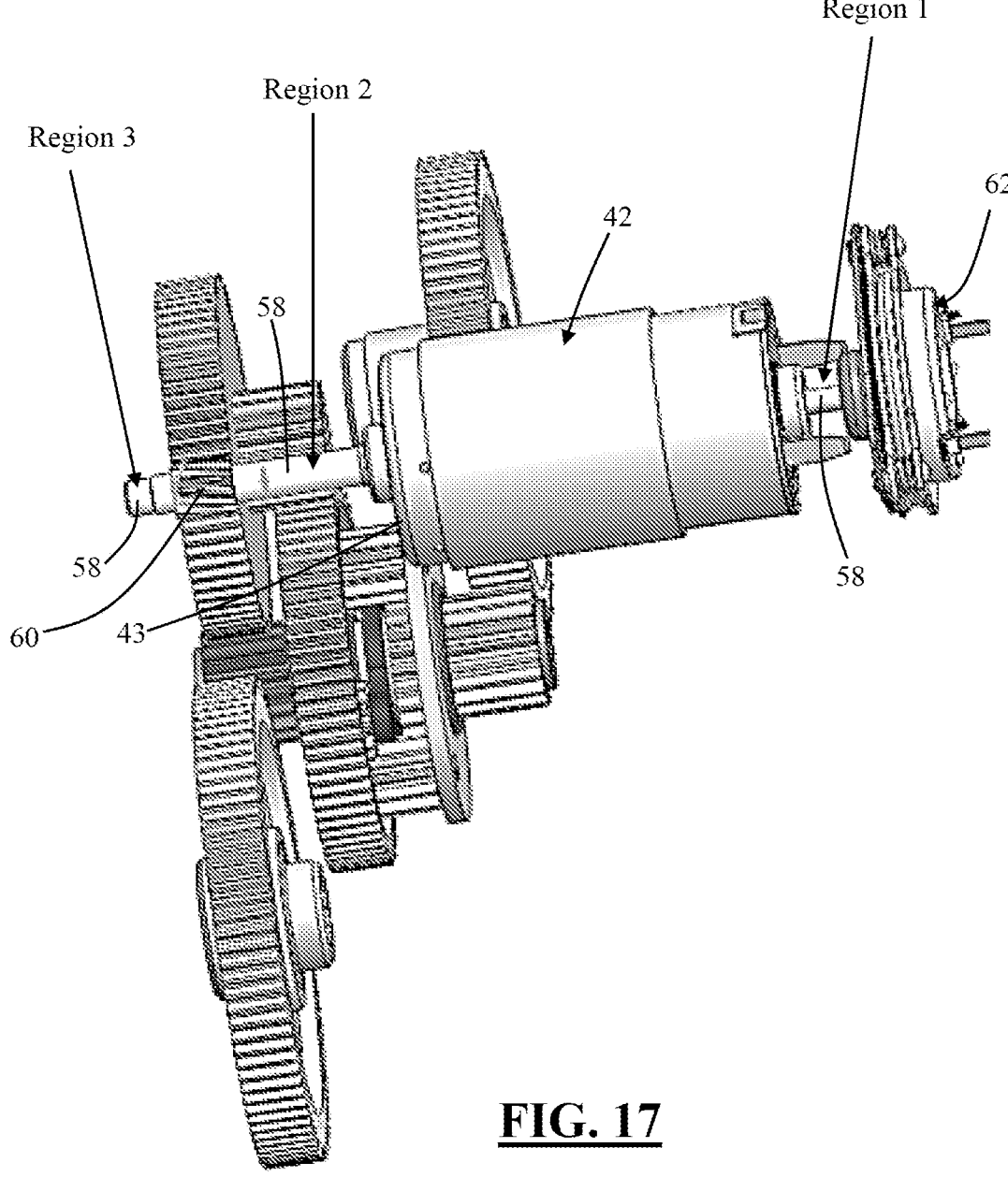
FIG. 17 is a perspective view of a torque distributing assembly, without the housing.

FIG. 17 illustrates the various regions 1, 2, 3 that the brake 62 can be connected to the motor 42 or to the motor output shaft 58. The brake 62 can be connected to the output shaft 58 in a rear region of the motor 42 (Region 1); in a front region of the motor between the motor housing 43 and the output gear 60 (Region 2); or on an opposite side of the output gear 60 (Region 3). In certain embodiments, the brake 62 may be provided within the motor housing 43.

The explanations and illustrations presented herein are intended to acquaint others skilled in the art with the invention, its principles, and its practical application. The above description is intended to be illustrative and not restrictive. Those skilled in the art may adapt and apply the invention in its numerous forms, as may be best suited to the requirements of a particular use.

Accordingly, the specific embodiments of the present invention as set forth are not intended as being exhaustive or limiting of the teachings. The scope of the teachings should, therefore, be determined not with reference to this description, but should instead be determined with reference to the appended claims, along with the full scope of equivalents to which such claims are entitled. The omission in the following claims of any aspect of subject matter that is disclosed herein is not a disclaimer of such subject matter, nor should it be regarded that the inventors did not consider such subject matter to be part of the disclosed inventive subject matter.

Plural elements or steps can be provided by a single integrated element or step. Alternatively, a single element or step might be divided into separate plural elements or steps.

The disclosure of "a" or "one" to describe an element or step is not intended to foreclose additional elements or steps.

While the terms first, second, third, etc., may be used herein to describe various elements, components, regions, layers and/or sections, these elements, components, regions, layers and/or sections should not be limited by these terms. These terms may be used to distinguish one element, component, region, layer or section from another region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below", or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The disclosures of all articles and references, including patent applications and publications, are incorporated by reference for all purposes. Other combinations are also possible as will be gleaned from the following claims, which are also hereby incorporated by reference into this written description.

The invention claimed is:

1. A brake system comprising:
a brake caliper supporting a brake pad, and having a first brake piston and a second brake piston that are configured to move the brake pad; a first rotary to linear stage mechanism connected to the first brake piston, and a second rotary to linear stage mechanism connected to the second brake piston;
a motor configured to generate torque;
a torque distributing assembly configured to receive torque from the motor and then distribute the torque from the motor to the first rotary to linear stage mechanism to move the first brake piston and/or to the second rotary to linear stage mechanism to move the second brake piston;
wherein the torque distributing assembly comprises:
i) a first driving gear connected to the first rotary to linear stage mechanism;
ii) a second driving gear connected to the second rotary to linear stage mechanism;
iii) a first set of planet gears supported on respective first axles;
iv) a second set of planet gears supported on respective second axles; and
v) a first carrier plate having a plurality of support features each configured to support a respective one of the first axles and a respective one of the second axles.

2. The brake system according to claim 1, wherein the torque distributing assembly comprises a third set of planet gears supported on respective third axles.

3. The brake system according to claim 2, wherein the torque distributing assembly comprises a second carrier plate, having a plurality of support features each configured to support a respective one of the third axles.

4. The brake system according to claim 3, wherein the first carrier plate and the second carrier plate are generally parallel to one another.

5. The brake system according to claim 3, wherein a central axis extends through the second carrier plate, and a radial distance of the second set of planet gears from the central axis is greater than a radial distance of the third set of planet gears from the central axis.

6. The brake system according to claim 2, wherein the third axles are generally parallel to the first axles and/or second axles.

7. The brake system according to claim 2, wherein one or more of the second set of planet gears have an axial height or length that is larger than an axial height or length of one or more of the third set of planet gears.

8. The brake system according to claim 2, wherein teeth of the third set of planet gears meshingly engage teeth of a centrally located sun gear, and teeth of the second set of planet gears meshingly engage the teeth of the third set of planet gears.

9. The brake system according to claim 1, wherein the torque distributing assembly comprises a ring gear having an internal ring portion, wherein the first set of planet gears are situated within the internal ring portion.

10. The brake system according to claim 9, wherein the ring gear comprises one or more mounting features for fixing the ring gear to a housing or other non-moving member.

11. The brake system according to claim 1, wherein the first carrier plate has a first side and an opposing second side, wherein the first set of planet gears are supported on the first side of the first carrier plate and the second set of planet gears are supported on the second side of the first carrier plate.

12. The brake system according to claim 1, wherein the torque distributing assembly comprises a first support plate having a plurality of support features configured to support a respective one of the first axles.

13. The brake system according to claim 1, wherein the brake pad is an inner brake pad and each of the first and second brake pistons are configured to move an end of the inner brake pad.

14. The brake system according to claim 1, wherein the brake system comprises a brake to prevent movement or back driving of the motor to maintain a clamping force after the motor is turned OFF or is no longer generating the torque.

15. The brake system according to claim 1, wherein the motor and the torque distributing assembly are contained within a housing, and the housing is connected to the brake caliper via one or more fasteners.

* * * * *